United States Patent
Ortega et al.

(10) Patent No.: US 7,312,416 B2
(45) Date of Patent: Dec. 25, 2007

(54) APPARATUS AND METHODS FOR UNDERWATER WELDING

(75) Inventors: Frank Ortega, San Jose, CA (US); John Edward Maslakowski, Westlake Village, CA (US); Hsueh-Wen Pao, Saratoga, CA (US)

(73) Assignee: General Electric Company, Schenectady, NY (US)

( * ) Notice: Subject to any disclaimer, the term of this patent is extended or adjusted under 35 U.S.C. 154(b) by 414 days.

(21) Appl. No.: 10/861,504

(22) Filed: Jun. 7, 2004

(65) Prior Publication Data
US 2005/0269383 A1 Dec. 8, 2005

(51) Int. Cl.
*B23K 26/12* (2006.01)

(52) U.S. Cl. .............. 219/121.63; 219/72; 219/121.21; 219/137 R

(58) Field of Classification Search .............. 219/72, 219/74, 121.21, 121.6, 121.63, 121.45, 121.47, 219/136, 137 R
See application file for complete search history.

(56) References Cited

U.S. PATENT DOCUMENTS

| | | | |
|---|---|---|---|
| 4,035,602 A * | 7/1977 | Berghof ....................... 219/72 |
| 4,133,180 A * | 1/1979 | Nobileau et al. ........... 405/170 |
| 5,527,441 A | 6/1996 | Offer et al. |
| 5,649,355 A | 7/1997 | Offer |
| 5,670,072 A | 9/1997 | Offer et al. |
| 5,688,419 A | 11/1997 | Offer |
| 5,714,735 A | 2/1998 | Offer |
| 5,756,966 A | 5/1998 | Offer |
| 5,770,273 A | 6/1998 | Offer et al. |
| 5,793,009 A | 8/1998 | Offer |
| 5,852,271 A | 12/1998 | Offer |
| 5,958,261 A | 9/1999 | Offer et al. |
| 5,977,504 A | 11/1999 | Offer et al. |
| 5,977,515 A * | 11/1999 | Uraki et al. ........... 219/121.84 |
| 5,981,897 A | 11/1999 | Offer et al. |
| 5,994,659 A | 11/1999 | Offer |
| 6,191,379 B1 | 2/2001 | Offer et al. |
| 6,255,616 B1 | 7/2001 | Offer |
| 6,301,944 B1 | 10/2001 | Offer |
| 6,373,019 B1 | 4/2002 | Offer et al. |
| 6,417,476 B1 | 7/2002 | Offer et al. |
| 6,605,794 B1 | 8/2003 | Offer et al. |

* cited by examiner

*Primary Examiner*—Len Tran
(74) *Attorney, Agent, or Firm*—Nixon & Vanderhye, PC

(57) ABSTRACT

A lower housing having a lower chamber and a welding opening is fixed about an underwater weld site. The lower housing includes an upper opening, the lower housing being filled with water upon installation. A transport housing containing a welding unit in a dry state is lowered such that a bottom opening, closed by a closure element, registers with an upper opening of the lower chamber. Upon clamping the housings together, the lower chamber is at least partially evacuated. The closure element is then moved to an open position and the welding unit is lowered into the evacuated lower chamber to weld a patch to the vessel wall to overlay the damaged area.

7 Claims, 9 Drawing Sheets

APPARATUS AND METHODS FOR UNDERWATER WELDING

BACKGROUND OF THE INVENTION

The present invention relates to apparatus and methods for welding underwater and particularly relates to a two-stage dry chamber system for automatic underwater remote welding.

There are many environments in which welding must occur underwater. For example, nuclear reactor vessels contain water and the fuel bundles are maintained submerged. A nuclear reactor vessel typically has an interior stainless steel cladding overlying a low alloy carbon steel. In certain instances, the cladding is damaged exposing the low alloy carbon steel to the interior of the vessel. It is therefore necessary to apply a steel plate over the damaged area of the vessel and this operation is performed by welding the steel plate to the vessel in the underwater environment.

Generally, there are a number of different methods for maintaining welding apparatus dry while welding in an underwater environment. For example, a single chamber containing the welding unit may be utilized, the chamber being open at the bottom and sealed at the top. The chamber does not seal against the area to be welded but relies on trapped air in the chamber to maintain the welding unit dry. This however works only if the chamber can be lowered completely over the weld area such that the weld area is in a gaseous environment, e.g., atmospheric air or an inert gas, within the chamber. There are however various areas, for example, in a reactor vessel where the single chamber technique cannot be performed and generally the vessel has to be drained for repair. Accordingly there is a need for an underwater welding system which can be remotely actuated and perform welds generally without respect to the orientation of the weld area.

BRIEF DESCRIPTION OF A PREFERRED EMBODIMENT

In a preferred aspect of the present invention, there is provided a two-stage dry chamber system for automatic remote underwater welding. The first stage comprises a lower housing defining a chamber open to the water environment. The housing includes a welding opening for surrounding and sealing about the underwater area to be welded. An upper end of the lower housing is initially open to the water environment and enables alignment of the lower housing using a separately installed support frame and alignment fixture. The lower housing is remotely attached to the support frame and alignment fixture. After alignment of the lower housing a closure element moveable between closed and open positions is remotely attached to the top opening of the lower housing. With the closure element in the closed position, the lower housing can be pressure leak tested to assure seal worthiness prior to mating it with the transport housing. When the transport housing is in place, the closure element of the lower housing also allows, when open, the removal of the weld head and installation and removal of a variety of other tools such as weld repair tools into and out of the lower housing while maintaining them dry at all times. The closure element on the lower housing mates with and seals against a transport housing having a sealed chamber carrying a welding unit and, on occasion, other tooling that may be required such as weld repair tools. The transport housing is provided with a lower opening sealed by a closure element which is moveable between closed and open positions. The transport housing enables delivery to and removal of tools relative to the lower housing while maintaining them dry.

To use the system, the lower housing is located adjacent the welding site with the welding opening surrounding and sealing about the weld site. To accomplish that, a jig is lowered into the vessel and secured to the vessel skirt. The jig includes mechanisms for displacing the lower housing in radial in and out, circumferential and vertical directions. Those mechanisms may comprise lineal actuators or finally threaded screw drives, all remotely operated. With the lower housing in position relative to the weld site and the lower closure element in a closed position, the lower housing is evacuated using a fluid under pressure, e.g., air, nitrogen, or another inert gas, to expose the weld site to a gaseous and hence dry environment within the lower housing chamber. The transport housing containing the welding unit is then secured to the lower housing. Particularly, when the transport and lower housings are engaged with one another, the upper opening of the lower housing lies in registration with the lower opening of the transport housing, the two closure elements being located between the housing in the closed positions. Clamps are remotely actuated to seal the housings to one another about the registering openings.

The closure elements on the lower housing and on the transport housing are then moved to an open position and the welding unit is displaced from the transport housing into the lower housing to a welding location adjacent the welding site. Welding proceeds, and particularly, a patch is welded about the damaged portion requiring repair. During the welding operation, argon is continually introduced to the weld torch. To maintain constant pressure in the housings, a pressure regulator system is built into the lower housing. Upon completing the weld, the apparatus is removed in a manner reverse from its installation. For example, the welding unit is withdrawn into the upper housing and the closure elements are moved to positions sealing the upper chamber from the lower chamber. At this point other tools can be delivered to the lower housing by means of the transport housing following similar procedures. Once the repair is completed, upon unclamping the transport housing from the lower housing, both housings may then be removed from the underwater environment.

In accordance with a preferred aspect of the present invention, there is provided an underwater welding apparatus comprising a first housing defining a first chamber having a first opening and a closure element selectively moveable between positions closing and opening a second opening and a welding opening, the welding opening having a first margin for surrounding and sealing about an underwater welding site; a second housing defining a second closed chamber having a second opening; a closure member caused by said second housing selectively moveable between positions closing and opening the second opening; the first and second housings being engageable with one another with the first and second openings in registration with one another; and a welding unit carried by the second housing within the closed chamber and moveable through the registering openings from the second chamber into a welding position in the first chamber when the housings engage one another and the closure element is moved to the open position.

In a further aspect of the present invention, there is provided a method of welding underwater comprising the steps of: (a) locating a first housing underwater and adjacent an underwater welding site with an opening through a wall of the housing surrounding the welding site; (b) securing underwater a transport housing having a dry interior chamber containing a welding unit to the first housing; (c) at least partially evacuating water from the first housing to expose the weld site to a dry environment within the first housing; (d) moving the welding unit from the transport housing into the dry environment of said first housing and into a position for welding at the welding site; and (e) welding at the welding site.

DETAILED DESCRIPTION OF THE INVENTION

Figure 1:
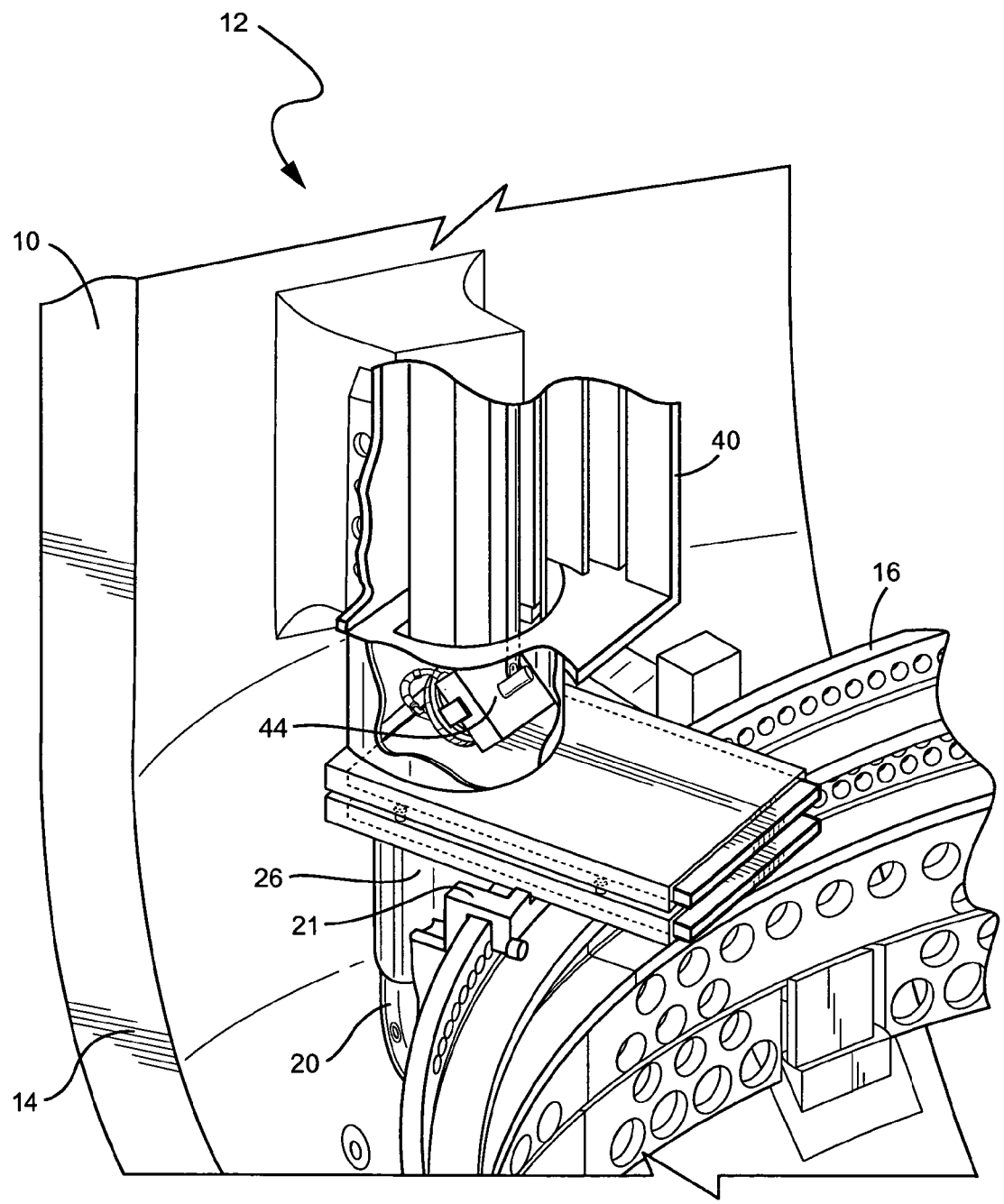
FIG. 1 is a partial perspective view with parts broken out of the interior wall portion of a nuclear reactor vessel illustrated with a skirt portion and upper and lower housings adjacent a welding site in accordance with a preferred aspect of the present invention

Referring to the drawings, particularly to FIG. 1, there is illustrated a wall portion 10 of a nuclear reactor vessel generally designated 12. Wall portion 10 has a lower hemispherical portion 14 as well as an internal skirt 16 radially spaced from the wall portion 10. It will be appreciated that the vessel 12 contains water in which the nuclear fuel bundles, not shown, are submerged. As noted previously, stainless steel cladding is formed along the interior wall surface of the vessel 12 and one or more sites of the cladding may be damaged and in need of repair, e.g., by welding an overlying patch or disk to the stainless steel surrounding the area needing repair. It will be appreciated that the area undergoing repair by welding may be 50 or 60 feet underwater and, in the environment of a nuclear reactor, the weld repair must take place not only underwater but remotely.

Figure 2:
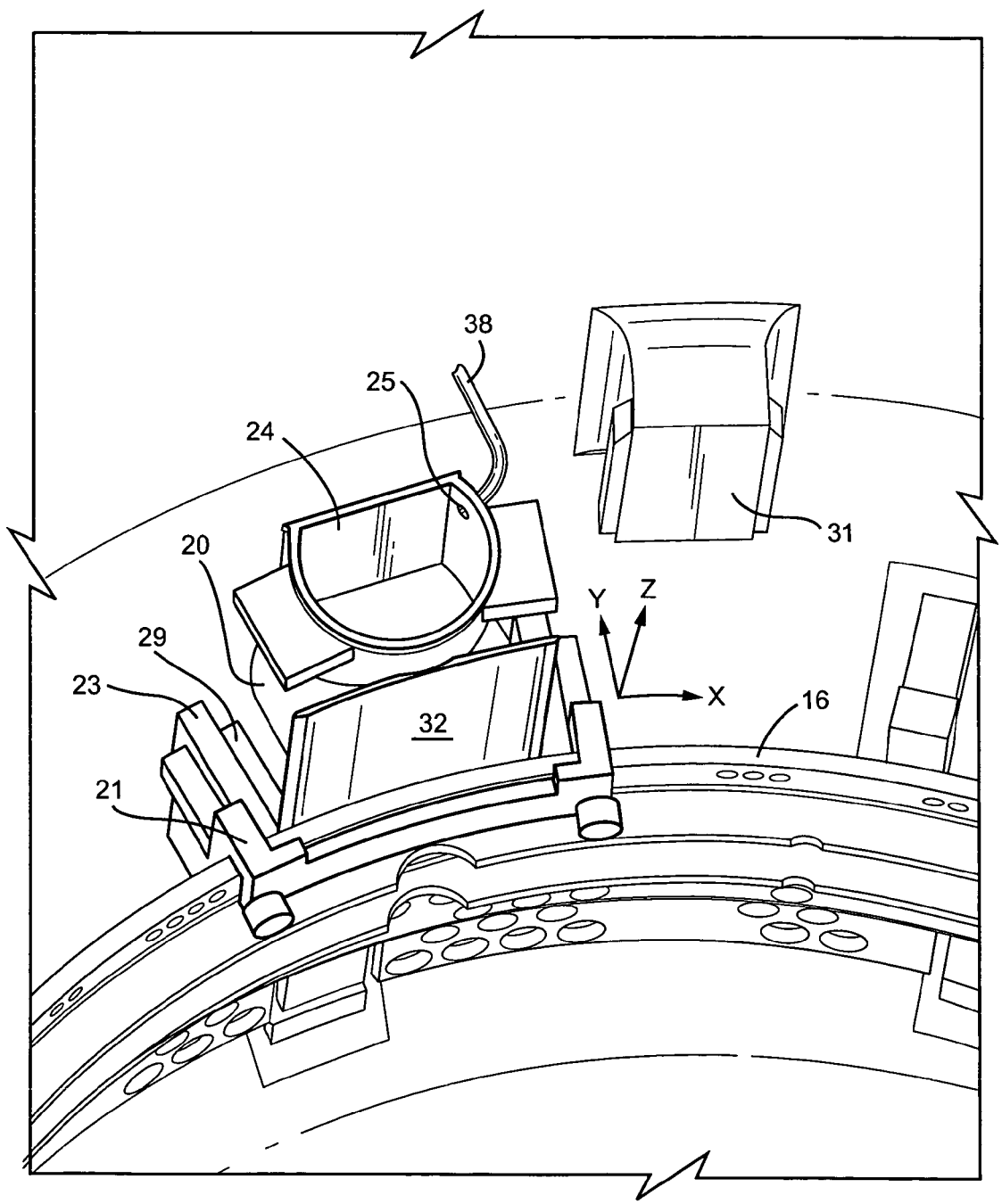
FIG. 2 is an exploded perspective view of the lower housing and its attachment to the skirt portion of the reactor vessel

Referring to both FIGS. 1 and 2, there is provided a first or lower housing 20 which defines an interior or first chamber 19 (FIG. 4) within the housing. For use at this particular location, i.e., between the hemispherical wall portion 14 and skirt portion 16 of a nuclear reactor vessel, the first housing 20 includes a first opening 24 (FIGS. 2-4) at an upper end of an upright section 26 (FIG. 4) which opens into the side wall of a cylindrical section 28 terminating in a welding opening 30. The opposite end of the cylindrical section 28 from the weld opening 30 is closed by a plate 32 which, in this particular application, bears against the outer diameter of the skirt portion 16 when put into place for welding. The opening 30 is also provided with an annular seal 34 for sealing the lower housing 20 about and surrounding the welding site, i.e., the area of the spherical wall portion 14 undergoing repair.

By using remote cameras, positioning devices and cables, the lower housing 20 can be lowered into the vessel and positioned with the opening 30 in registration with the welding site. The lower housing may be secured in that position by any one of a number of methods including clamps or bolts between the lower housing and skirt portion. In a preferred embodiment, a jig 21 is provided for receiving the lower housing 20. The jig 21 includes a pair of inverted generally L-shaped end structural supports 23 which are supported on the skirt 16 and which supports are spaced from and integrally connected with one another such that the lower housing 20 may be received between the supports 23. The jig 21 includes mechanisms 29 for displacing the lower housing 20 when seated in the jig in radial in and out, circumferential and vertical directions for actually positioning the opening 30 in registration with the welding site. Such mechanisms 29 may comprise linear actuators or finally threaded screw actuators to achieve fine adjustment of the location of the lower housing vis-a-vis the weld site. Thus, the lower housing 20 may be displaced by the actuators 29 relative to jig 21 in each of X, Y and Z directions of a Cartesian coordinate system illustrated by the arrows in FIG. 2.

Figure 3:
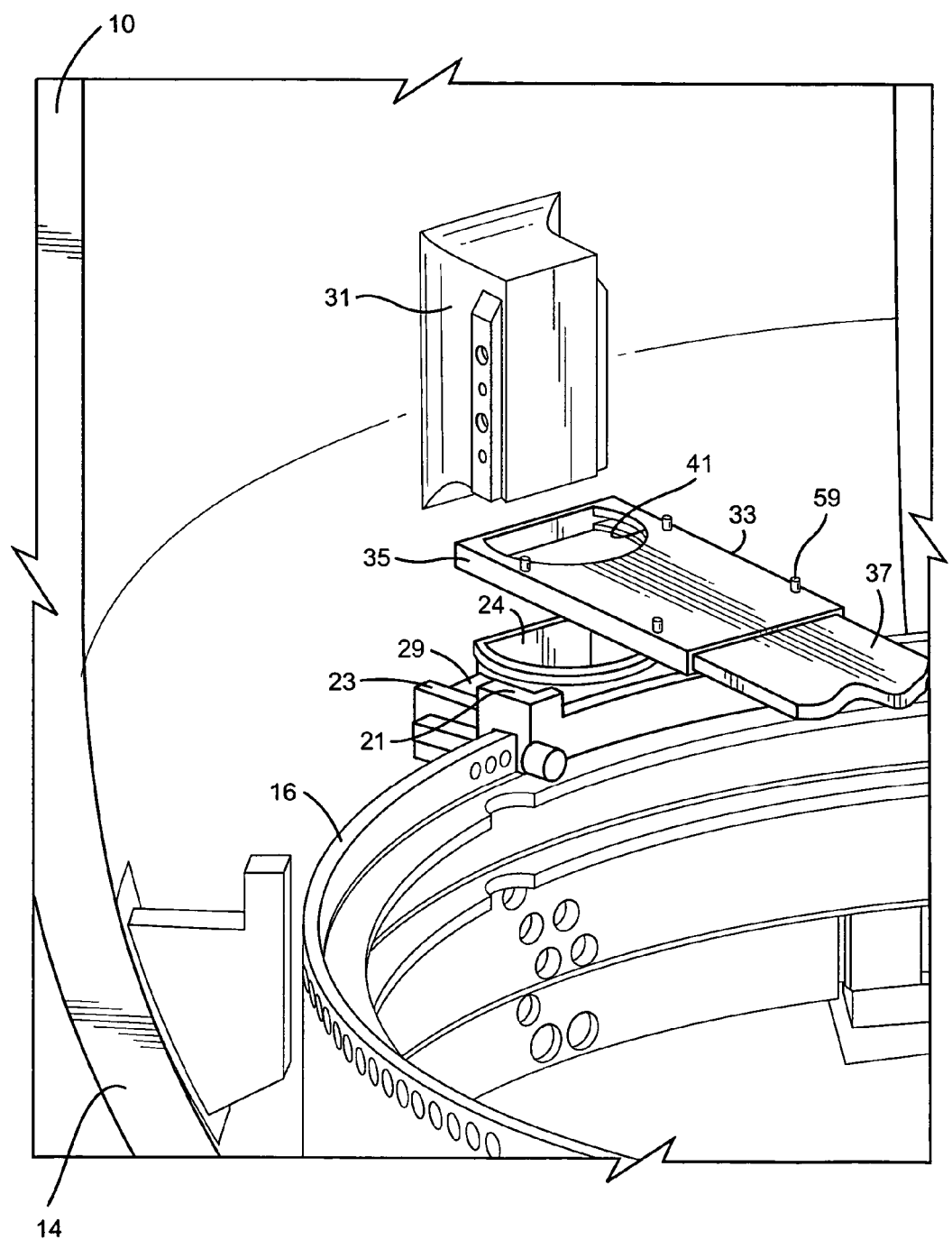
FIG. 3 is an exploded perspective view thereof also illustrating a lower closure element in position for sealing against the lower housing

Upon comparing FIGS. 2 and 3, it will be appreciated that the jig 21 mounts the lower housing 20 in a position circumferentially offset from a projection 31 in the wall of the vessel. Depending upon the particular reactor vessel, there can be one or more such projections or none and which projections may or may not interfere with the weld repair. In the illustrated instance, the lower housing 20 has been received and secured to the jig 21 at a location circumferentially offset from the projection 31. In FIG. 3, the linear actuators have displaced the jig along the skirt 18 to a position below the projection 31 since otherwise the lower housing may not pass by the projection 31 into a welding position below projection 31.

When the lower housing 20 has been secured in the jig in the welding position, the seal 34 seals against the hemispherical portion 14 about the damaged area. The lower housing also includes a lower one-way valve 36 as well as a fixture 25 located adjacent the upper end of housing 20 and coupled to a fluid line 38. It will therefore be appreciated that, with the lower housing 20 located within the vessel 10 with the opening 30 surrounding the area in need of repair, the housing 20 is located in position to receive a welding unit for welding at the weld site.

Figure 4:
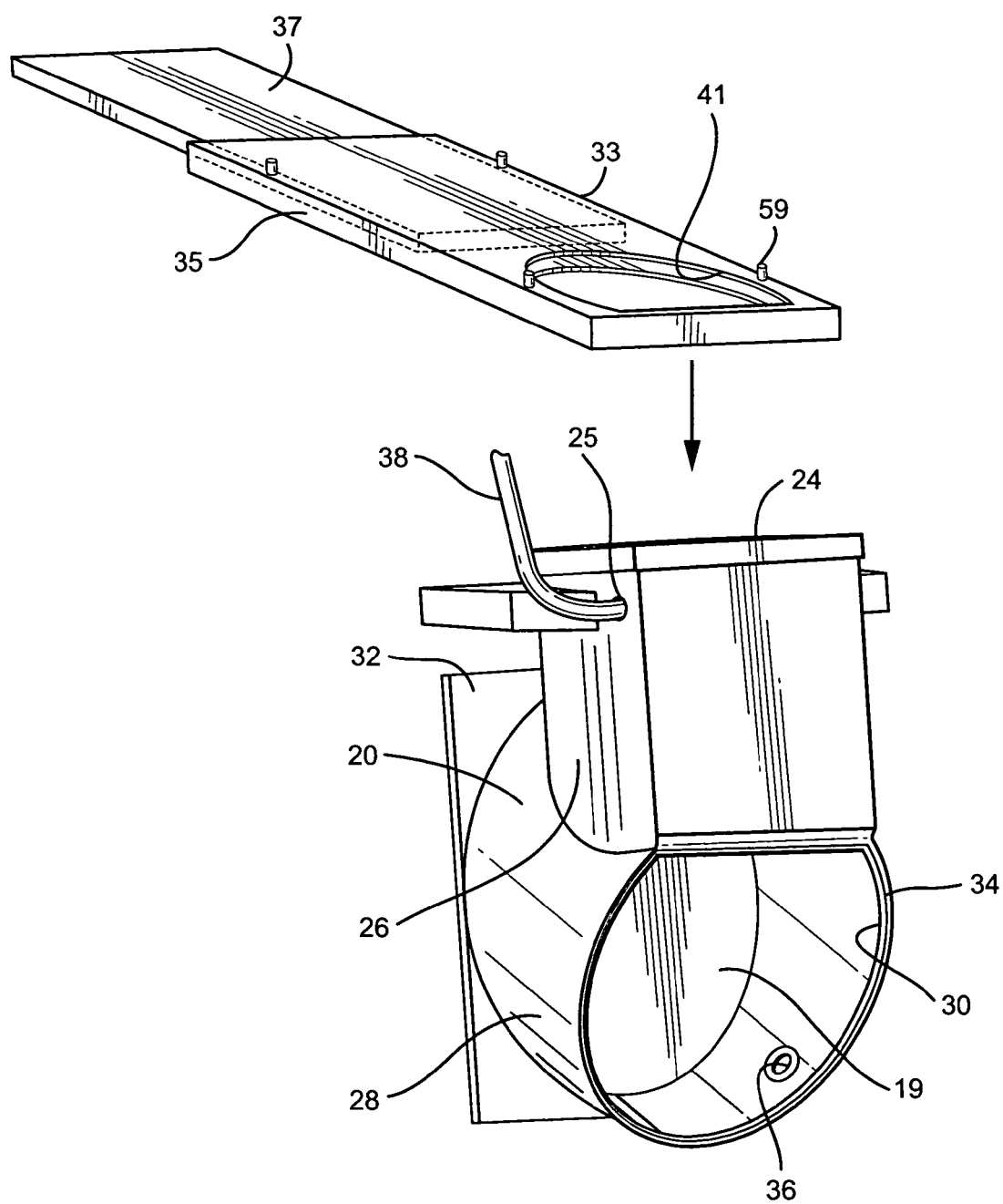
FIG. 4 is a perspective view of the lower housing and the closure element therefore

Also as illustrated in FIGS. 3 and 4, the lower housing 20 is provided with a closure element 33. The closure element 33 is secured to the lower housing 20 remotely underwater and includes an outer generally rectilinear sleeve 35 carrying a slideable closure member 37. The closure element 33 includes an opening 41. The opening 41 lies in registry with the opening 24 through the lower housing and maybe sealed in a closed position by inserting movement of the closure member 37 in sleeve 35 and opened by withdrawing movement of member 37 relative to sleeve 35 and into the illustrated position. It will thus be appreciated that the closure element 33 provides a seal about the upper opening 61 of the lower housing 20 when the closure member 37 lies in its closed position.

Figure 5:
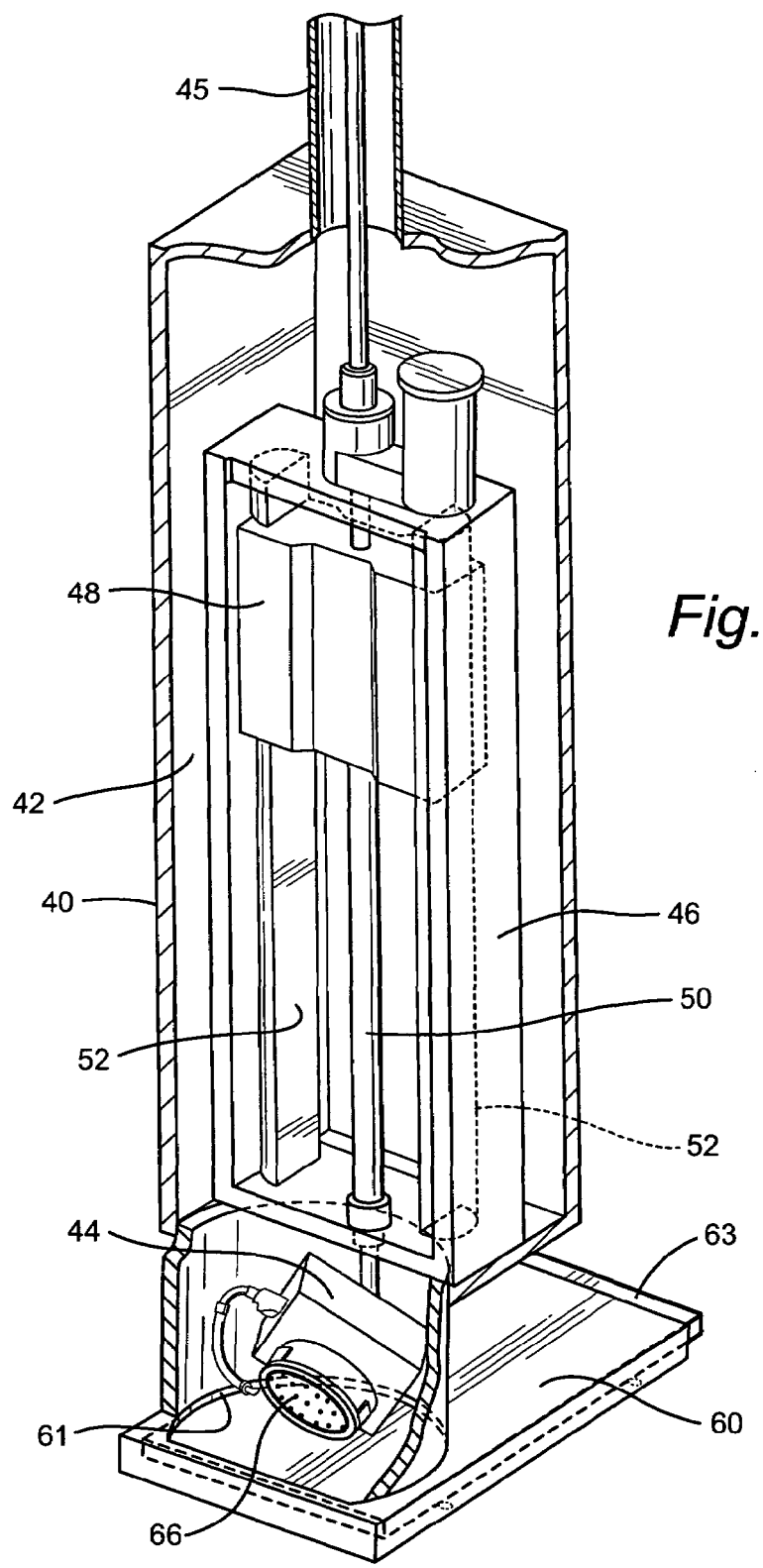
FIG. 5 is a perspective view with parts broken out and in cross-section illustrating the transport housing
Figure 6:
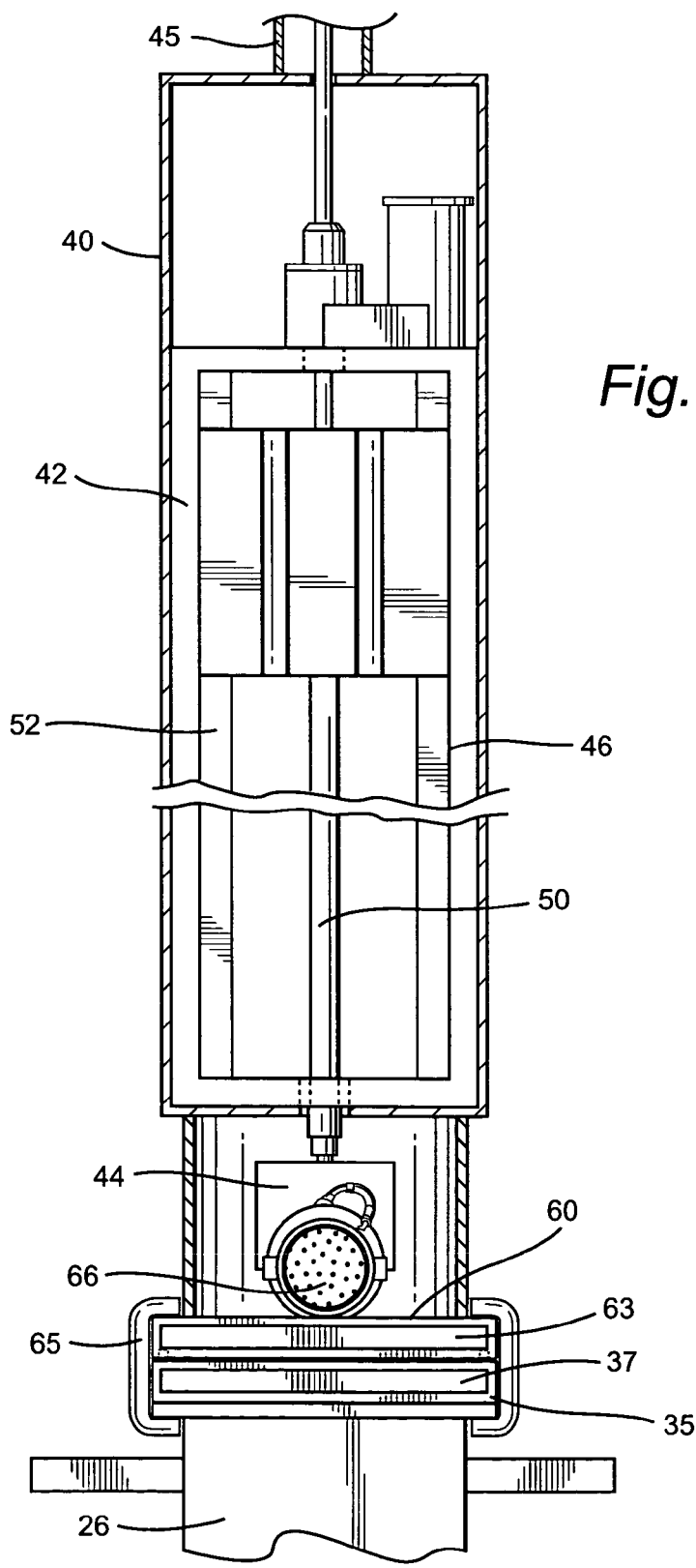
FIG. 6 is a front elevational view of the transport housing with parts broken out and in cross-sections and portions of the lower housing
Figure 7:
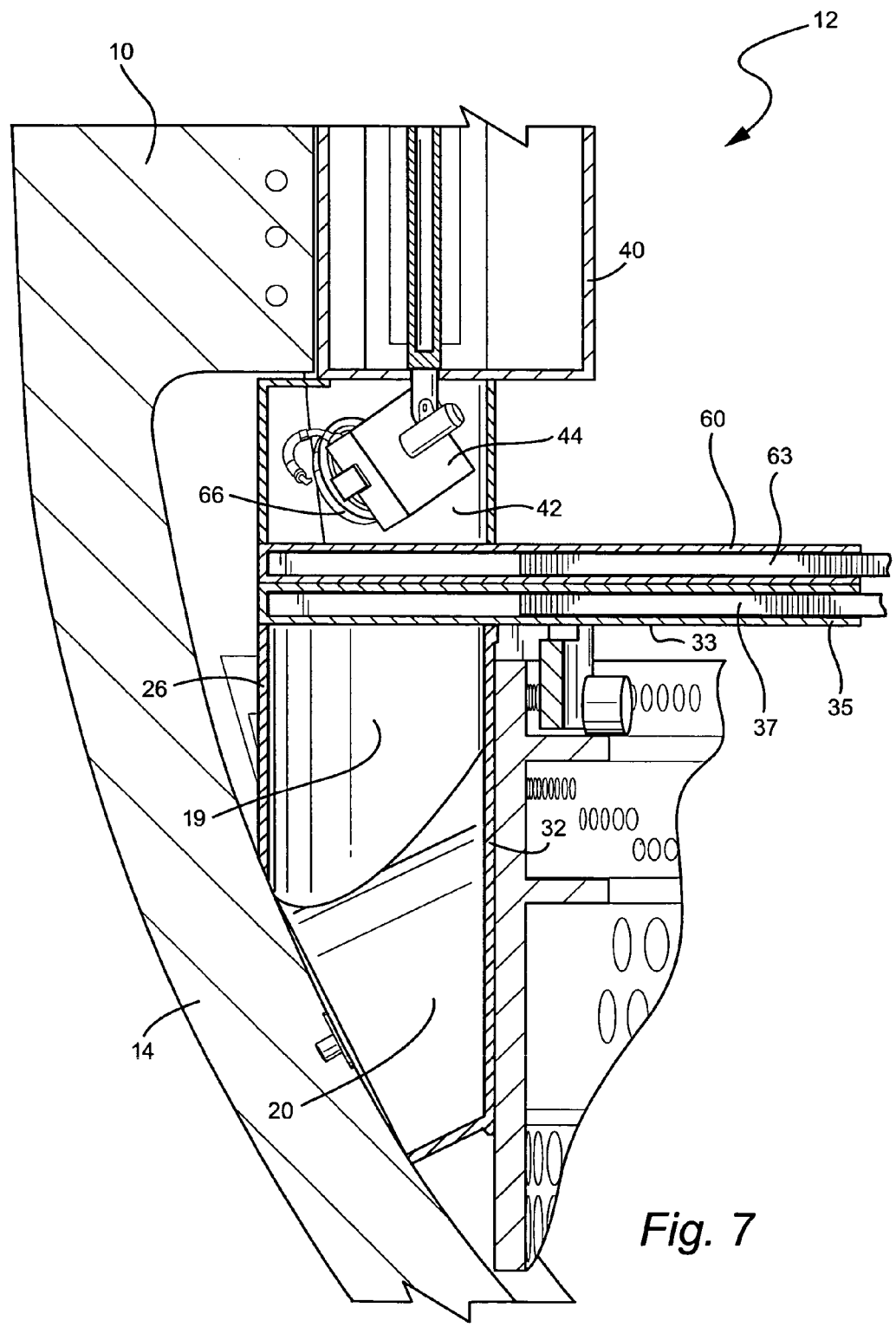
FIG. 7 is a view similar to FIG. 1 illustrating the transport housing coupled to the lower housing and the closure elements in an open condition
Figure 8:
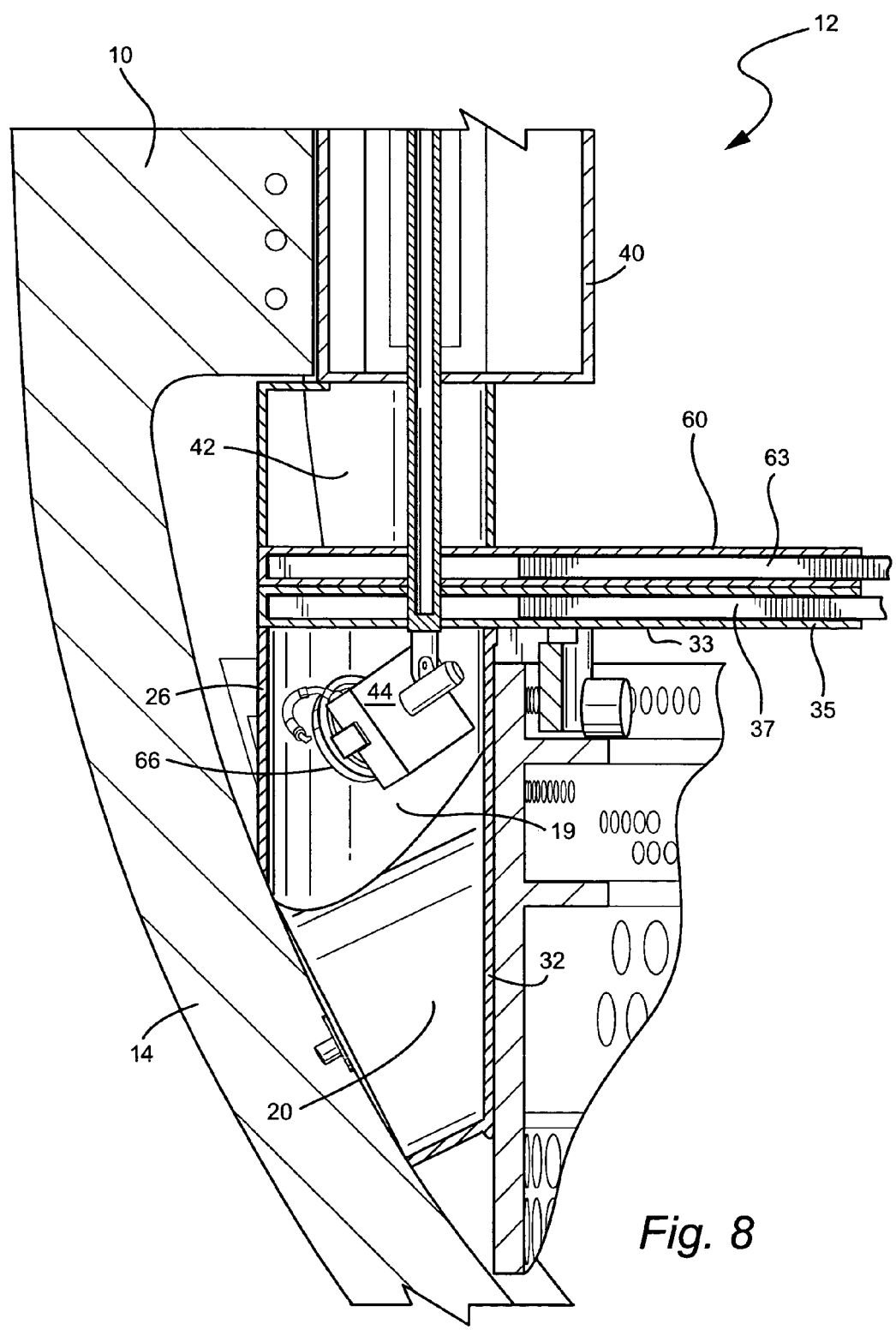
FIG. 8 is a view similar to FIG. 7 illustrating the welding unit passing through the registering openings of the transport and lower housings and FIG. 9 is a view similar to FIGS. 7 and 8 illustrating the welding unit in position for welding.
Figure 9:
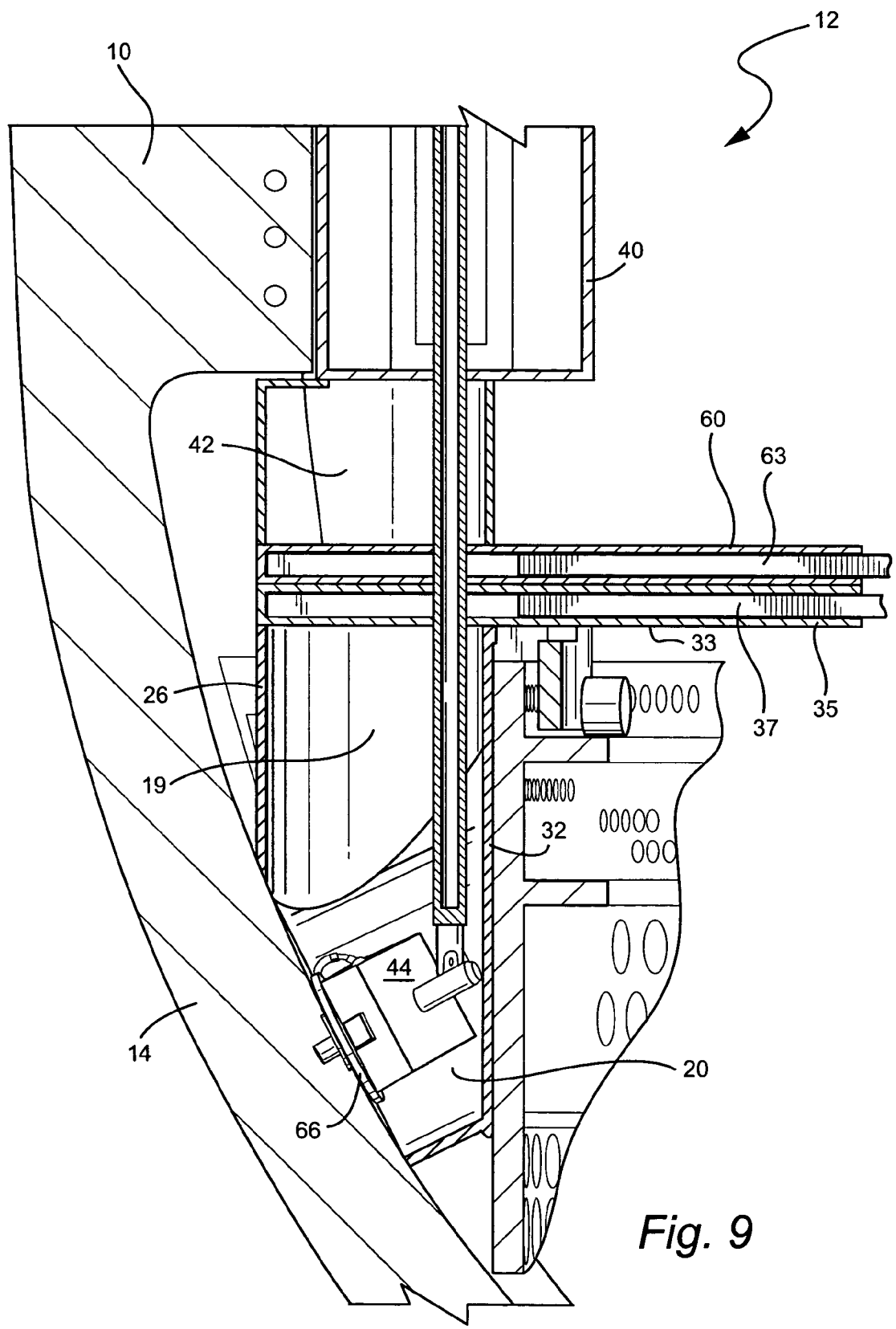

Referring now to FIGS. 5 and 6, there is illustrated a transport housing 40 which is closed and therefore has a dry interior. The housing 40 thus defines an interior chamber 42 for receiving a welding unit 44 and maintaining that unit in a dry environment as the transport housing 40 is disposed underwater, e.g., lowered into the vessel 10 as described below. The housing 40 includes an upstanding tube 45 which extends above the water's surface. A frame 46 is disposed within transport housing 40 and carries a slidable member 48. The slidable member 48 is coupled by a rod 50 to the welding unit 44 housed adjacent the lower end of housing 40. The member 48 is slidable along tracks or guides 52 along the opposite sides of the frame 46 between a position retaining the welding unit 44 within transport housing 40 and a position in which the welding unit 44 is displaced from housing 40 into the lower housing 20.

The lower end of the transport housing 40 is provided with a closure element 60. The closure element seals the lower end opening 61 of the transport housing 42 when in a closed position. Particularly, the closure element 60 includes a slideable closure member 63 for selectively sealing and opening the lower end opening 61 of the upper housing. By displacing the closure member 6360, e.g., laterally, the lower end of the housing 40 is opened sufficiently to enable the welding unit 44 to pass through the opening 61 and into the lower chamber 21 as described below.

The welding unit 44 may be a TIG welder and details of the welding unit are not provided as these are known. The welding unit 44 includes a clamp which releasably maintains a patch plate 66 on the welding unit for welding the plate 66 to the vessel wall portion 14. The welding unit includes cameras as well as a source of inert gas such as argon, a welding torch and other ancillary equipment necessary to effect a weld and particularly necessary to weld the patch 66 to the interior of the wall portion 14.

To operate the welding system, the jig 21 is lowered into the vessel and disposed on the skirt 16. The lower housing 20 is then lowered and located on the jig in welding position with the opening surrounding the area subject to repair. The closure element 33 is then suitably secured to the lower housing 20 in sealing relation about opening 41. Adjustments in radial, vertical and circumferential directions are then made by actuating the linear actuators to locate the lower housing 20 with the seal 34 about opening 30 in sealing engagement about the weld site. It will be appreciated that the lower housing 20 is situated in an underwater environment and the interior chamber 21 of housing 20 is filled with water upon its installation in the vessel 10.

The transport housing 40 is then lowered into the water environment and onto the lower housing 20. The opening 61 of closure element 60 is closed by member 63. Guide pins 59 on the closure element 33 of the lower housing 20 engage in complementary openings on the closure element 60 of the transport housing 40 and align the transport housing 40 with the lower housing 20. It will be appreciated that other types of alignment means between the two housings can be used, e.g., pins may be provided on the transport housing with complementary openings on the lower housing. Another example of suitable alignment means may include complementary guide tracks on the two housings. Suitable clamps, for example, swing clamps, may be provided on either one or both of the housings or closure elements 33 and 60 such that when the closed opening 24 through the upper end of the lower housing 20 and the closed opening 61 at the lower end of the transport housing 40 register with one another, the housings may be clamped and sealed to one another with the closure elements 33 and 60 therebetween. Clamps for this purpose are schematically illustrated at 65 in FIG. 6.

When the transport housing and lower housing are clamped to one another, the lower housing can be at least partially evacuated. Thus, air or inert gas, e.g., nitrogen, is introduced under pressure via line 38 and water is evacuated from chamber 19 through the one way valve 36 in the lower housing. Thus, with the water in lower housing chamber 19 at least partially evacuated, the weld site is exposed to the air or inert gas atmosphere. Upon adequate evacuation of the lower housing chamber, the closure members 37 and 63 are moved from their closed positions to their open position affording a sealed communication passage between the transport and lower housings through the registering openings 24 and 61 and which passage is sealed from the surrounding water environment. The closure members elements are displaced remotely by any suitable means, e.g., air cylinders or electrically operated motors and gearing arrangement. When the closure members are sufficiently opened, the welding unit 44 can be lowered into the lower housing 20. That is, the tube or cable connected to the slidable member 48 can be lowered to lower the tube 50 and welding unit 44 whereby the welding unit 44 passes through the registering openings 24 and 61 into the lower chamber 19. Because the lower housing is accurately fixed relative to the weld site and the transport housing 40 is accurately aligned with the lower housing 20 by the pins, the lowering of the welding unit locates the weld patch or disk into position overlying the damaged section of the vessel wall portion 14. The welding operation may then proceed under the control of a remote operator by moving the welding torch and feed wire about the patch using cameras as a visual guide to enable peripheral welding of the patch to the vessel portion 10.

Upon completion of the repair, the welding unit is withdrawn into the transport housing 40. The closure elements 33 and 60 are returned to their closed positions by displacing members 37 and 63, respectively, to seal respective openings 41 and 61 whereby the welding unit 44 is maintained in a dry condition. With the opening 61 sealed by closure member 63, the clamps are retracted and the transport housing 40 is removed, e.g., raised, from the lower housing 20. The lower housing 20 may then removed from the jig and the jig subsequently removed leaving the patch or disk 66 welded to the spherical wall portion 14. Alternatively, other tools may be transported to the welding site using similar procedures.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An underwater welding apparatus comprising:
    a first housing defining a first chamber having a first opening and a welding opening, said welding opening having a first margin for surrounding and sealing about an underwater welding site;
    a second housing defining a second closed chamber having a second opening;
    a closure member caused by said second housing selectively moveable between positions closing and opening said second opening;
    said first and second housings being engageable with one another with said first and second openings in registration with one another;

a welding unit carried by said second housing within said closed chamber and moveable through said registering openings from said second chamber into a welding position in said first chamber when said housings engage one another and said closure member is moved to said open position; and a jig attachable to a structure to be welded for mounting said first housing at said welding site.

2. Apparatus according to claim 1 including means for aligning the first and second housings into predetermined positions relative to one another as the housings engage one another.

3. Apparatus according to claim 1 wherein said second housing includes guides for aligning said welding unit with said weld area upon movement of said welding unit from said first housing to said second housing.

4. Apparatus according to claim 1 including means carried by said first housing for at least partially evacuating water from said first chamber.

5. Apparatus according to claim 1 including means for displacing said first housing relative to said jig in one of the X, Y and Z directions of a Cartesian coordinate system.

6. Apparatus according to claim 1 wherein said first housing includes a first closure member selectively movable between positions opening and closing said first opening.

7. Apparatus according to claim 1 including a first closure member selectively moveable between positions opening and closing said first opening.

* * * * *